US 11,971,989 B2

(12) United States Patent
Warwick et al.

(10) Patent No.: US 11,971,989 B2
(45) Date of Patent: Apr. 30, 2024

(54) COMPUTER RECOVERY SYSTEM

(71) Applicant: Predatar Ltd, Oxon (GB)

(72) Inventors: Neil Warwick, Oxon (GB); Anton James, Oxon (GB); Steve Miller, Oxon (GB); Richard Norgate, Oxon (GB)

(73) Assignee: Predatar Ltd, Oxon (GB)

( * ) Notice: Subject to any disclaimer, the term of this patent is extended or adjusted under 35 U.S.C. 154(b) by 157 days.

(21) Appl. No.: 17/165,167

(22) Filed: Feb. 2, 2021

(65) Prior Publication Data

US 2022/0245250 A1     Aug. 4, 2022

(51) Int. Cl.
*G06F 11/14*   (2006.01)
*G06F 21/56*   (2013.01)
*G06F 21/57*   (2013.01)

(52) U.S. Cl.
CPC ........ *G06F 21/568* (2013.01); *G06F 11/1464* (2013.01); *G06F 11/1469* (2013.01); *G06F 21/57* (2013.01)

(58) Field of Classification Search
CPC ............... G06F 21/568; G06F 11/1464; G06F 11/1469; G06F 21/57; G06F 11/1448
See application file for complete search history.

(56) References Cited

U.S. PATENT DOCUMENTS

| | | |
|---|---|---|
| 7,962,956 B1 | 6/2011 | Liao et al. |
| 8,495,037 B1 | 7/2013 | Westenberg |
| 9,940,460 B1 | 4/2018 | Derbeko et al. |
| 2007/0283438 A1 | 12/2007 | Fries et al. |
| 2008/0016564 A1* | 1/2008 | Claudatos ............. G06F 21/568 726/22 |
| 2008/0047013 A1 | 2/2008 | Claudatos et al. |
| 2009/0113151 A1 | 4/2009 | Teranishi et al. |
| 2011/0078497 A1 | 3/2011 | Lyne et al. |
| 2011/0197277 A1* | 8/2011 | Figlin ................. H04L 63/1408 709/224 |
| 2012/0124007 A1 | 5/2012 | Sten et al. |
| 2016/0092308 A1 | 3/2016 | Bates |
| 2017/0223031 A1 | 8/2017 | Gu et al. |

(Continued)

FOREIGN PATENT DOCUMENTS

GB     2469308 A     10/2010

OTHER PUBLICATIONS

Invitation to Pay Additional Fees containing Search Report for PCT/GB2022/050271 mailed May 12, 2022, all pages.

(Continued)

*Primary Examiner* — J. Brant Murphy
*Assistant Examiner* — Aayush Aryal
(74) *Attorney, Agent, or Firm* — Kilpatrick Townsend & Stockton LLP

(57) ABSTRACT

A computer-implemented method can be used for restoring a computer system following an infection event. The computer system can have a plurality of machines, in which a plurality of back-up copies are associated with each one of the plurality of machines, and in which each of the plurality of back-up copies associated with a particular machine is a different version back-up. The method can include searching the plurality of back-up copies to identify one or more clean-back-up copies that do not comprise a signature of the infection event and restoring one or more of the plurality of machines using a respective clean-back-up copy.

20 Claims, 15 Drawing Sheets

(56) References Cited

U.S. PATENT DOCUMENTS

| | | | |
|---|---|---|---|
| 2018/0248896 A1* | 8/2018 | Challita | G06F 21/554 |
| 2019/0138727 A1* | 5/2019 | Dontov | G06F 11/1464 |
| 2019/0235973 A1* | 8/2019 | Brewer | G06F 11/1469 |
| 2019/0286533 A1 | 9/2019 | O'Mahony et al. | |
| 2019/0286534 A1 | 9/2019 | O'Mahony et al. | |
| 2019/0342305 A1* | 11/2019 | Sunkaranam | H04L 63/145 |
| 2020/0065487 A1 | 2/2020 | Timashev et al. | |
| 2020/0319979 A1* | 10/2020 | Kulaga | G06F 11/3006 |
| 2020/0342106 A1* | 10/2020 | Chelarescu | G06F 11/2097 |
| 2020/0349016 A1 | 11/2020 | Chang et al. | |
| 2020/0379853 A1 | 12/2020 | Beloussov et al. | |

OTHER PUBLICATIONS

Combined Search and Examination Report for GB2115448.9 dated Apr. 25, 2022, all pages.
Examination Report for Application No. GB2115448.9 mailed Nov. 2, 2023, all pages.
Lovelace et al., "IBM Tivoli Storage Manager as a Data Protection Solution," First Edition (Aug. 2014) Version 7, Release 1, of IBM Tivoli Storage Manager family of products, ibm.com/redbooks, 354 pages.

* cited by examiner

Predatar Recovery Engine

Recent/Current Recovery Activity

| Backup Agent | TCP Host Name | Chargeback Group | Backup Service Catalogue | Cloud Recovery Start Time | Restored VM Name | Current Running Cost | Status | Options |
|---|---|---|---|---|---|---|---|---|
| SS-DEVDEV-MAN-2015 | DEV-MAN-2015 | Support | | 2020-06-16 15:14:41343 | DEC-VAN-2015_SMGSJUD_06112020_13:13:57 | $2.33 | Virus Detected Critical ! | ▣ |
| SS-DEVDEV-MAN-2015 | DEV-MAN-2020 | Support | | 2020-06-16 15:14:41343 | DEC-VAN-2020_SMGSJUD_06112020_13:13:57 | $2.33 | Recovering | ▣ |
| SS-DEVDEV-MAN-2015 | DEV-MAN-VEPROXY | Support | | 2020-06-16 15:14:41343 | DEC-VAN VEPROXY_PMICSJUD_06112020_13:13:57 | $2.33 | Recovered-No virus detected ✓ | ▣ |

Actions

| Live Enter Infection Signature. Search for uninfected backups | Recover GFIS Clean to PCQ | Install and Run PHP in PQC | Install and run AV | PQC Move Clean to production | Flag as condemned hardware for OS reinstall and notify when ready for BA Client/TDP Restore |
| Declare OS platforms / versions clear here and prompt for removal from recovery groups | Search for latest Pre RID Time backups and recover to safety | Immediately backup all clearly scanned boxes | | | |

FIG. 4

Perform Bulk Or Emergency Recovery

Recovery Details

Reason*: NW received an anonymous call at 15:43 23/10/20 stating that we had been hacked our key directories locked. Only windows boxes prior to Windows 2012 seem to have been infected. The Ransomeware vector seems to be a file call scaryransom.exe and it appears to encrypt directories changing the extension to *.oops. Only HQ is currently infected. Please join ZOOM Detail here ASAP.

Password*:

RID Time: Select RID Date & Time

[Done] [Cancel]

FIG. 6A

Update Recovery Group

Recovery Group Information

Name*: Production

Description: RTO in the event of disruption/disaster is 8 hours

Priority: MEDIUM-LOW

RID Time: 3-Oct-2020 06:00:00

[Done] [Cancel]

FIG. 6B

| Edit Action | |
|---|---|
| Action Settings | |
| Name | Live Enter Infection Signature, Search for uninfected backups |
| File Extensions | *.TJODT<br>*.32aa<br>*.efji<br>*.easy2lock<br>*.maddog<br>*.mmpa<br>*.loki<br>*.Bioawards<br>*.pepe<br>*.nyan<br>*.*.XINOF |

[Done] [Cancel]

FIG. 6C

Apply Action

Are you sure you want to apply the action 'Live Enter Infection Signature, Search for uninfected backups' on the following nodes?

| Server | Type | Entry |
|---|---|---|
| SPBAAS02(1) | SP | PRP-SQL-01_SQL |
| SPBAAS02(1) | SP | PREDBLD01_SQL |
| SPBAAS02(1) | SP | HVFRA2K19_HV_DM |

[Yes] [No]

FIG. 6D

| Actions | Recover GFIS Clean to PCQ | Install and Run PHP in PQC | Install and run AV | PQC Move Clean to production | Flag as condemned hardware for OS reinstall and notify when ready for BA Client/TDP Restore |
|---|---|---|---|---|---|
| Live Enter Infection Signature, Search for uninfected backups | Search for latest Pre RID Time backups and recover to safety | Immediately backup all clearly scanned boxes | | | |
| Declare OS platforms / versions clear here and prompt for removal from recovery groups | | | | | |

COMPUTER RECOVERY SYSTEM

FIELD

The present disclosure relates to apparatus, systems and methods for restoring a computer system following an infection event, and in particular, although not necessarily, for recovering one or more of a plurality of machines of a computer system following a malware or ransomware attack.

BACKGROUND

Public and private organisations of all shapes and sizes rely on the reliable and secure operation of their computer networks. It is not uncommon for a particular proprietor's network to contain thousands of machines, or virtual machines, spread across the globe. The interconnectivity of these machines allows collaboration but also increases the risk of infection by malware or ransomware, as the number of infection points increases. Ransomware can be especially problematic as it may encrypt the contents of a computer system's memory and demand that a ransom be paid by the proprietor in exchange for the decryption keys. Such infections can have devastating financial and reputational consequences for organisations and the scale of existing networks and their interconnectivity can create significant challenges in recovering from such events. In particular, the scale of loss can be reduced and resilience of the network can be improved by the effectiveness of the disaster recovery process. Disaster recovery is typically achieved by the restoration of backup copies recorded at an earlier time. However, in existing solutions the process of restoring a network containing a number of machines may be time consuming and complex work, requiring significant operator skill to implement an effective recovery strategy. One or more aspects of the present disclosure are directed to alleviating such difficulties.

SUMMARY

According to a first aspect of the present disclosure there is provided a computer-implemented method for restoring a computer system following an infection event, the computer system having a plurality of machines, in which a plurality of back-up copies are associated with each of the plurality of machines, and in which each of the plurality of back-up copies associated with a particular machine is a different version back-up, the method comprising:
   searching the plurality of back-up copies to identify one or more clean-back-up copies that do not comprise a signature of the infection event; and
   restoring one or more of the plurality of machines using a respective clean-back-up copy.

For each of the plurality of machines, each of the plurality of back-up copies may be searched to identify one or more clean-back-up copies that do not comprise a signature of the infection event.

The method may comprise determining an infection-datum-time for the computer system by identifying a creation time of a clean-back-up copy created before an earliest back-up copy that comprises a signature of the infection event.

The method may comprise identifying the respective clean-back-up copy for each respective one of the plurality of machines based on the infection-datum-time and restoring each respective one of the plurality of machines using the respective clean-back-up copy.

The method may comprise identifying a pre-event clean-back-up copy created before the infection-datum-time. The method may comprise identifying a post-event back-up copy created after the infection-datum-time. The method may comprise restoring one or more of the plurality of machines using the pre-event clean-back-up copy and the post-event back-up copy.

The plurality of machines may be partitioned into at least: a first-recovery-group of machines comprising a first plurality of the machines; and a second-recovery-group of machines comprising a second plurality of machines.

The method may comprise restoring the first-recovery-group of machines using a respective first-clean-back-up copy for each respective one of the first plurality of machines. Each first-clean-back-up copy may be created before a first-infection-datum-time.

The method may comprise restoring the second-recovery-group of machines using a respective second-clean-back-up copy for each respective one of the second plurality of machines. Each second-clean-back-up copy may be created before a second-infection-datum-time. The second-infection-datum-time may be earlier than the first-infection-datum-time.

The first-recovery-group of machines may comprise one or more immune machines that are excluded from the first plurality of machines.

The first plurality of machines may be geographically situated within a first-geographical-area. The second plurality of machines may be geographically situated within a second-geographical-area. The first-geographical-area may be non-overlapping with respect to the second-geographical-area.

The first plurality of machines may use a first operating system. The second plurality of machines may use a second operating system. The first operating system may be distinct from the second operating system.

Restoring one or more of the plurality of machines may further comprise restoring the one or more machines in a computing environment that is isolated from potential sources of infection.

Restoring one or more of the plurality of machines may comprise installing anti-virus software dated subsequent to the infection-datum-time on at least one of the plurality of machines.

The signature of the infection event may be a user defined signature.

The method may comprise providing a graphical user interface comprising elements associated with actions in the method for restoring the system. The method may comprise providing a graphical user interface comprising elements associated with the plurality of machines. The method may comprise receiving a user selection associating one or more of the plurality of machines with one of the actions.

The election may be achieved by dragging one or more elements associated with the plurality of machines to one of the actions. The elements associated with the plurality of machines may include an indication of a status for each of the plurality of back-up copies associated with the respective machines.

The method may comprise providing a graphical user interface comprising elements associated with actions in the method for restoring the system. The method may comprise providing a graphical user interface comprising elements associated with the first-recovery-group. The method may comprise providing a graphical user interface comprising elements associated with the second-recovery-group. The method may comprise receiving a user selection associating the first- or second-recovery-group with one of the actions.

The method may comprise determining which backup to use for a different machine based on the identified backup copy for a first machine. The backup copy for different backup copy may be as old or earlier than the identified back-up.

According to a further aspect, there is provided a computer-implemented method for restoring a computer system following an infection event, the computer system having one or more machines, in which a plurality of back-up copies are associated with each of the one or more machines, and in which each of the plurality of back-up copies associated with a particular machine is a different version back-up, the method comprising:
- searching the plurality of back-up copies to identify one or more of the back-up copies that do not comprise a signature of the infection event; and
- restoring one or more machines for which a back-up copy that does not comprise the indicator of the infection event are identified According to a further aspect, there is provided a graphical user interface for restoring a computer system following an infection event. The graphical user interface may comprise any of the elements configured to perform the functionality described herein.

According to a further aspect, there is provided an apparatus comprising:
- at least one processor; and
- at least one memory including computer program code for one or more programs,
- the at least one memory and the computer program code configured to, with the at least one processor, cause the apparatus to perform any method disclosed herein or provide any of the graphical user interfaces described herein.

According to a further aspect, there is provided a computer program product including one or more sequences of one or more instructions which, when executed by one or more processors, cause an apparatus to at least perform any method disclosed herein or provide any of the graphical user interfaces described herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The Figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which:

FIGS. 6a to 6d illustrate various style of boxes that may be used in combination with the GUI layout of FIG. 4 at various stages in the process;

FIGS. 7a to 7e illustrate various aspects of the actions portion;

FIG. 10 illustrates another example of a protection map; and

DETAILED DESCRIPTION

The present disclosure provides an environment for improving the efficiency of infection recovery management, which may be achieved by iterative search of recoveries in a secure quarantined area, isolated from potential sources of infection, to ensure the latest uninfected recovery point can be recovered. This can be undertaken without the involvement of third-party software. For example, existing backup systems may not natively provide the functionality to scan for malware within the back-up files at the point of recovery.

Previously unrecognized malware captured in backup operations can be eliminated during restore operations, so that recovery from a malware attack does not reseed the recovery environment with the malware that caused the original attack.

It may be advantageous to prioritize restore processes. Initial efforts can focus on the most critical applications, so in some examples it is important to have defined a preferred restore order and the procedures in place. In the first instance this can be fulfilled by inspecting the candidates in pre-configured Recovery Groups of machines that form the computer system and removing immune assets from those groups where they are not integral to the function of the group. Immunity can often be inferred by Operating System type and version, since some systems/versions may not be vulnerable to certain attacks. An option can apply conditions on the group that automatically remove immune assets in bulk from recovery groups.

It may be possible to ensure a clean environment. Often the presence of ransomware can go undetected resulting in backups that contain the ransomware, which can be triggered again after recovering from the initial attack. Therefore, it is important to ensure that backup software can scan for and remove ransomware during recovery from a ransomware attack. This requirement is satisfied by the Quarantine and Clean module of the present disclosure or by a Global File Infection Search (GFIS) where it is supported by the backup application. This feature allows suspected infection signatures to be entered centrally in a GUI. GFIS then automatically runs a search for these filenames/extensions against multiple supported backup applications to identify the youngest backup held that does not contain the infection signature. This uninfected backup may then marked as ready for recovery and antivirus (AV) scan in the PQC (Predatar Quarantine and Clean) production.

Figure 1:
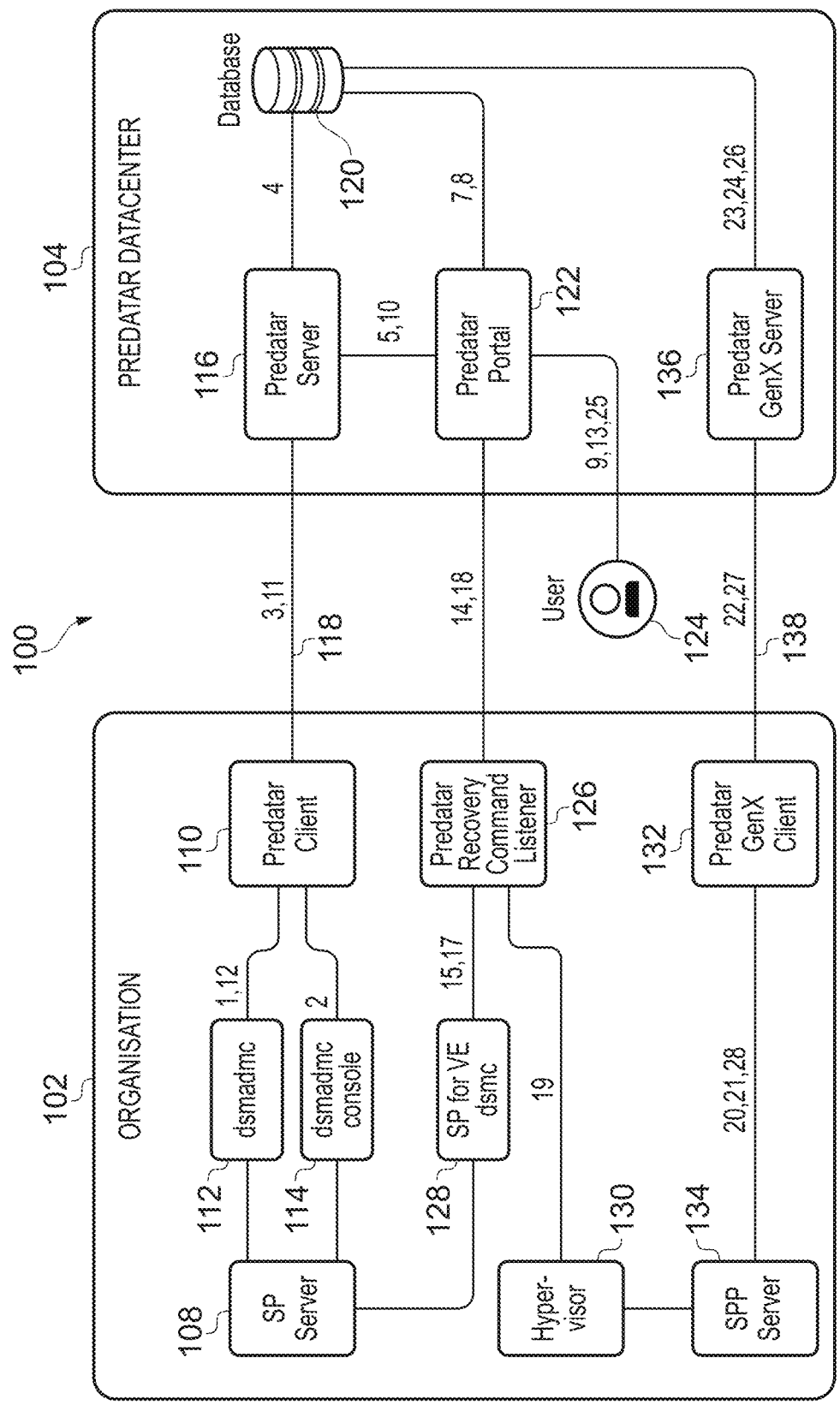
FIG. 1 shows an architecture and data flow for a standard backup system.

FIG. 1 shows the architecture and data flow for a standard backup system 100, which will be contrasted with the Ransomware Recovery Logical flow described below in relation to FIG. 3, which describes aspects of the applicant's soon-to-be launched 'Predatar' Recovery product.

The standard backup system 100 is divided between components that are part of a client organisation 102 that receive the backup service and a data centre 104 that provides the backup service.

The standard backup system 100 may be implemented using a known data protection and recovery system that is widely used, such as the IBM® Spectrum Protect™ (Tivoli® Storage Manager, TSM). Spectrum Protect permits an organisation to recover their data either onsite or at a disaster response site. Services provided by Spectrum Protect include tracking and managing the retention of data from organisations, providing centralised data protection, to assist with the retrieval of previously backed up and archived data and to allow for local site recovery and DR operations at second site. An overview of the service a TSM provides, how TSM works and the structure of a TSM system can be found at http://www.redbooks.ibm.com/redbooks/pdfs/sg248134.pdf, as viewed on 28 Jan. 2021.

Collecting Data from Spectrum Protect Server 108

A client 110 runs SELECT or QUERY commands on a Spectrum Protect Administrative command line (dsmadmc) 112. The client 110 reads ANR/ANE (Application Not Responding/Ascending Numerical Order) messages that appear on the Spectrum is Protect Administrative command line console (dsmadmc in console mode) 114. The client 110 parses the text output on the Administrative command line 114 and sends it to a server 116. The data is sent over a secure connection 118 to the server 116, which may use 1024-bit AES/RSA encryption methods. The server 116 receives the data and inserts it into a database 120. The server 116 notifies a portal 122 of the data insertion. The portal 122 filters the data to check if the data is breaching any defined thresholds. The Portal 122 then raises an alert or ticket in the database 120. The Portal 122 gets data from the database 120 to display it on the Portal 122.

Sending Commands from the Portal 122 to the Client 110 for Spectrum Protect Derver 108

A User 124 may issue a command from the Portal 122 such as running a data collection or restarting the Client 110. The command is picked up by the Server 116. The command is sent to the Client 110 (the Client 110 can keep polling the Server 116 for any commands). The Client 110 reads the command and performs the relevant action such as running the command on the Spectrum Protect Administrative command line (dsmadmc) 112 or restarting itself, for example.

Running Disaster Recovery Test for a VM from the Portal 122

The User 124 can issue a restore command from the Portal 122. A Recovery command listener 126 picks up the command from the Portal 122. The Recovery command listener 126 can keep polling the Portal 122 for any command. The Recovery command listener 126 runs the restore command on a Backup-Archive command line (dsmc) 128. A Virtual Machine (VM) is restored in a specified hypervisor 130. The Recovery command listener 126 reads the result of the restore from the Backup-Archive command line 128. The Recovery command listener 126 sends the result of the restore to the Portal 122. The Recovery command listener 126 then deletes the VM from the Hypervisor 130 once the restore has finished.

Collecting Data from Spectrum Protect Plus Server 134

A second client 132 makes API calls to the Spectrum Protect Plus server 134 to collect information, such as a list of protected and non-protect VMs or vSnap utilization. The second client 132 and the client 110 may be provided as one. The second client 132 reads the results return by the API call. The second client 132 sends the results to the second server 136. The data is sent over a secure HTTPs connection 138 through Web API calls. The second server 136 receives the data and inserts it in the database 120. The Portal 122 gets data from the database 120 to display it on the Portal 122 as reports, for example.

Sending Commands from the Portal 122 to the Second Client 132

The User 124 issues a command from the Portal 122 such as running a data collection. The command is picked up by the second server 136. The second server 136 and the server 116 may be provided as one. The command is sent to the second client 132 (the second client 132 can keep polling the Server 136 for any commands). second client 132 reads the command and performs the action such as making an API call to the Spectrum Protect Plus server 134.

Whilst suites such as Spectrum Protect and their implementation in such systems may be extremely powerful, their use in an organisation of any significant size quickly becomes very complex and requires active management. Experts are therefore required to configure and manage the data protection system and develop and test bespoke data protection policies and recovery procedures. Known data protection solutions and disaster recovery contracts with third party organisations can also be expensive for an organisation.

Figure 2:
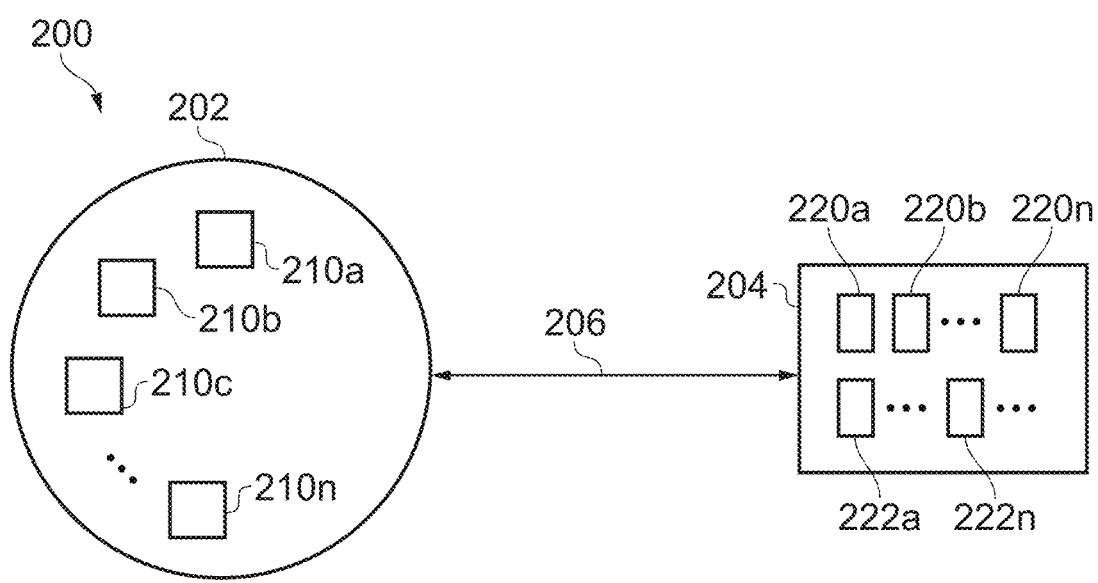
FIG. 2 shows a system for backing up and subsequently restoring a computer system 202 using a backup server.

FIG. 2 shows a system 200 for backing up and subsequently restoring a computer system 202 using a backup server 204. The computer system 202 is connected to the backup server 204 by an appropriate two-way network connection 206. The computer system 202 has a plurality of distinct machines, including a first machine 210a, a second machine 210b, a third machine 210c and an Nth machine 210n. Each one of the plurality of machines 210a-n may be physically located in the same or different locations, and may run the same or different operating systems. A machine as described herein may in general be a physical machine or a virtual machine.

Backup copies of any one or more of the plurality of machines 210a-n can be transmitted to the backup server 204. The backup server 204 can store a first back-up copy 220a, a second backup copy 220b and further backup copies including an Nth backup copy 220n for each machine 210a-n. Each of these backup copies 220a-n may be a different version with respect to one another, such as by having been created at different points in time. This can enable the computer system 202 to be restored to its condition as it was at different times in the past.

One purpose for which the backup copies may be used is to restore the computer system 202 after it has been attacked by malware or ransomware. Such attacks can be classified as infection events. A problem with restorations following an infection event can arise because ransomware, in particular, may not initiate its attack against the computer system 202 as soon as it has infected one of the machines 210a-n. The ransomware may lie dormant for a period of time before launching an attack. Therefore, restoring one or more of the machines 210a-n using one or more of the backup copies 220a-n may restore the computer system 202 to condition in which the ransomware is still present.

To prevent this problem, of restoring to an already-infected state, it is possible to search the backup copies 220*a-n* for a signature of the infection event, such as a digital signature of the ransomware responsible for launching the attack. If each of the first to Nth backup copies 220*a-n* contain the signature then none of these copies will be suitable for providing restoration of the computer system 202, at least not without additional processing to deal with the malware that infects the backup copies 220*a-n*. However, further searching of the backup server 204 may identify a first clean-back-up copy 222*a* and further clean-back-up copies, such as an Nth clean-back-up copy 222*n*, that do not contain the signature of the malware. Any one of the clean-back-up copies 222*a-n* can then be used to restore one or more of the machines 210*a-n* of the computer system 202 to an uninfected state that does not include the malware detected by the presence of the signature in the later backup copies 220*a-n*.

In the event that all of the machines 210*a-n* of the computer system 202 are infected with malware it is possible to search the backup server 204 to identify one or more clean backup copies for each one of the machines 210*a-n* and then to restore each of the machines 210*a-n* with an appropriate clean-backup copy. In this instance, each of the clean-back-up copies should be free from the presence of any signature of the infection event.

To identify suitable clean back up copies it can be advantageous to determine an infection datum time (which may also be called a ransom infection datum time) for the computer system 200. The infection datum time can be the same time as a creation time of a clean back up copy that was created directly before the earliest back-up copy that does contain a signature of the infection event. By identifying the earliest back-up copy that does contain the signature of the infection event it is then readily possible to identify suitable clean back-up copies for any machine within the computer system 202 that should also be free of infection, since the clean back-up copies were created at or before the infection datum time.

In some examples, different clean back-up copies may be identified for each of the plurality of machines 210*a-n* by identifying back-up copies that were created at or before the infection datum time that are relevant to each in turn of the machines 210*a-n* and can be used to restore each of the machines 210*a-n*. This may be advantageous, even where for a particular machine an apparently clean back-up copy may be identified that was created after the infection datum time. Having been created after the infection datum time it is possible that the back-up concerned is not truly clean since it may contain malware related to the infection event, but which does not contain the particular signature that has been identified to determine the infection datum time. Not all malware associated with a specific infection event will contain the same signature.

In some examples it may be possible, for a particular machine, to identify both a pre-event clean-back-up copy that was created before the infection-datum-time and a post-event back-up copy that was created after the infection-datum-time. The post-event back-up copy may contain valuable information that is not present in the pre-event clean back-up copy, but may also contain undetected ransomware, or other malware. However, it can be possible to restore the particular machine using both the pre-event clean-back-up copy and the post-event back-up copy by combing the two different backups. This combination may be achieved by identifying areas of the post-event back-up copy that have a low risk of containing malware and using those areas for the restoration, while using data from the pre-event back-up copy, that corresponds to high-risk parts of the post-event back-up copy, to complete the restoration. For example, to make a merged protected machine, there may be provided a method comprising: i) recovering the pre-event clean backup copy (restore a); ii) recovering the post-event backup copy (restore b); iii) identifying the file systems or files of restore b that show infection patterns and that should not be restored; iv) using restore a, comparing files from that system with equivalent files from restore b; and v) if those files have a more recent date stamp and are flagged as clean, moving those files across from the image in restore b to the image in restore a.

It is possible to treat each machine 210*a-n* separately, to determine an infection-datum-time for each machine separately and select an appropriate clean back-up copy for each machine based on its particular infection-datum-time. It is also possible to determine an infection-datum-time for the entire computer system 202. However, in other examples, it may be advantageous to partition the machines 210*a-n* into distinct groups of machines, such as a first-recovery-group consisting of the first machine 210*a* and the second machine 210*b*, and a second-recovery-group consisting of the third machine 210*c* to the Nth machine 210*n*.

The first-recovery-group and the second-recovery-group can be analysed and restored separately from one another. The machines 210*a-b* of the first-recovery-group can be considered, and an earliest back-up of either machine 210*a-b* that does not contain a signature of an infection event may be identified and used to specify a first infection datum time. Clean back-up copies can then be identified for the first-recovery-group of machines 210*a-b* that were created before the first infection datum time and used to restore the machines 210*a-b* of the first recovery group. Similarly, a second infection datum time can be defined by finding the earlies instance of an infection signature in back-up copies relevant to the machines 210*c-n* of the second-recovery-group. All machines 210*c-n* of the second recovery group can then by restored using clean backup-copies created before the second infection datum time, which can be earlier than, or later than, the first infection datum time.

An advantage of partitioning the computer system 202 into a plurality of different recovery groups of machines can arise because different groups of machines may have different levels of exposure to malware threats and/or different levels of defences or immunity to malware threats. For example, different recovery groups may be formed based on the machines within each recovery group using different operating systems, since some threats may be specific to a particular operating system while being ineffective in infecting other different operating systems. Similarly, some recovery groups may be formed based on all machines within a particular recovery group being located within a common geographical area or within a predetermined distance threshold of each other. Where all machines in a recovery group are present in the same location, they may all share a vulnerability to a malware attack such as where that attack is launched by a person who has physical access to the location and thereby to the machines. Machines physically situated at other remote locations, that do not overlap with the vulnerable location, may not be subject to the same mode of attack and may therefore be immune to that attack.

If for any reason a particular machine that would otherwise be part of a given recovery group is determined to be immune from the attack (such as a machine that is present in a vulnerable location, but which uses a different operating system or other software compared to other machines in the same location) then the immune machine can be removed from the recovery group concerned. Conversely, immune machines may be grouped together into their own recovery group, such that a different infection datum time can be determined for the immune machines and recovery can be effected accordingly.

Irrespective of how the infection datum time is determined for any particular machine or recovery group of machines, any machine that is to be restored can be restored in a computing environment that is isolated from the rest of the computer system 202. This isolation may ensure that if an infected back-up is used, the infection cannot spread to other machines within the computer system 202. Conversely, the isolation of the machine to be restored can also ensure that the machine will not be subject to any further attacks or attempted attacks during the restoration process.

Optionally, during the restoration of any machine, anti-virus software can be installed on the machine. Preferably, the anti-virus software may have been produced after the infection datum time such that it may be configured to neutralize the malware responsible for the infection event.

The signature of the infection event may be determined by any suitable means. It may be obtained from a database of signatures of malware or in some instances it may be determined or provided by a user of the computer system 202.

In summary, a process for facilitating disaster recovery may include—
1) detecting that an infection event has occurred (alternatively, the process could be entirely user-initiated from observations);
2) obtaining one or more signatures of infection from the user for the infection event;
3) for selected machines, scanning the back-up files for the one or more signatures of infection to determine a recovery point (or that no back-up is available);
4) restoring the selected one or more machines from the back-up files at a recovery point in a quarantined area;
5) optionally checking restored machines;
6) patching the restored machines with up-to-date antivirus in the quarantine area; and
7) moving clean machines from the quarantine area to a normal environment.

A specific implementation of such a method is described below with reference to FIG. 3. Implementation of such a method may be provided by a graphical user interface, which is described further below with reference to FIG. 4 onwards.

Such software products may be used to implement disaster recovery. "War Room" users are users drawn from a Service Provider and Organisation staff that orchestrate the recovery process. War Room Users may not all be regular Predatar users, but they may have skills that will be key to a concerted recovery, such as, for example:

Network/Security Specialist—prepared to provide a list of local admin system accounts and password preferably in advance or immediately on request in the event of a War Room scenario. These accounts and passwords may be necessary to populate the PHP script in the PQC environment and in order to run the anti-virus against suspect VM's before the VMotion to Production.

Provisioning Team—Individuals familiar with the organisations processes for commissioning both virtual and physical machines across the environment, Senior Management—Nominated executives from both the Service Provider and the Organisation.

Figure 3:
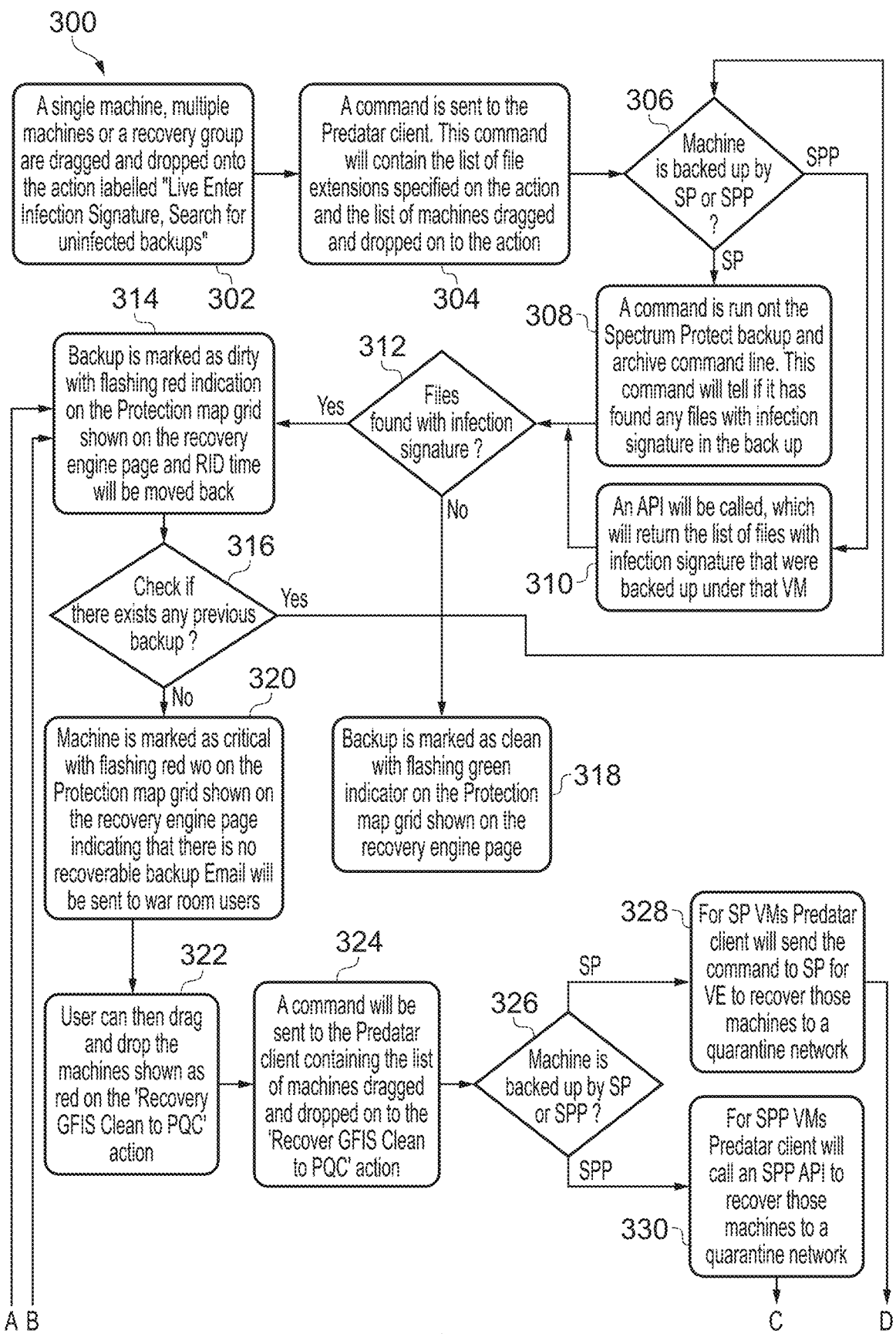
FIG. 3 shows an architecture and logical flow of a computer-implemented method for operating a Ransomware Recovery system.
Figure 3:
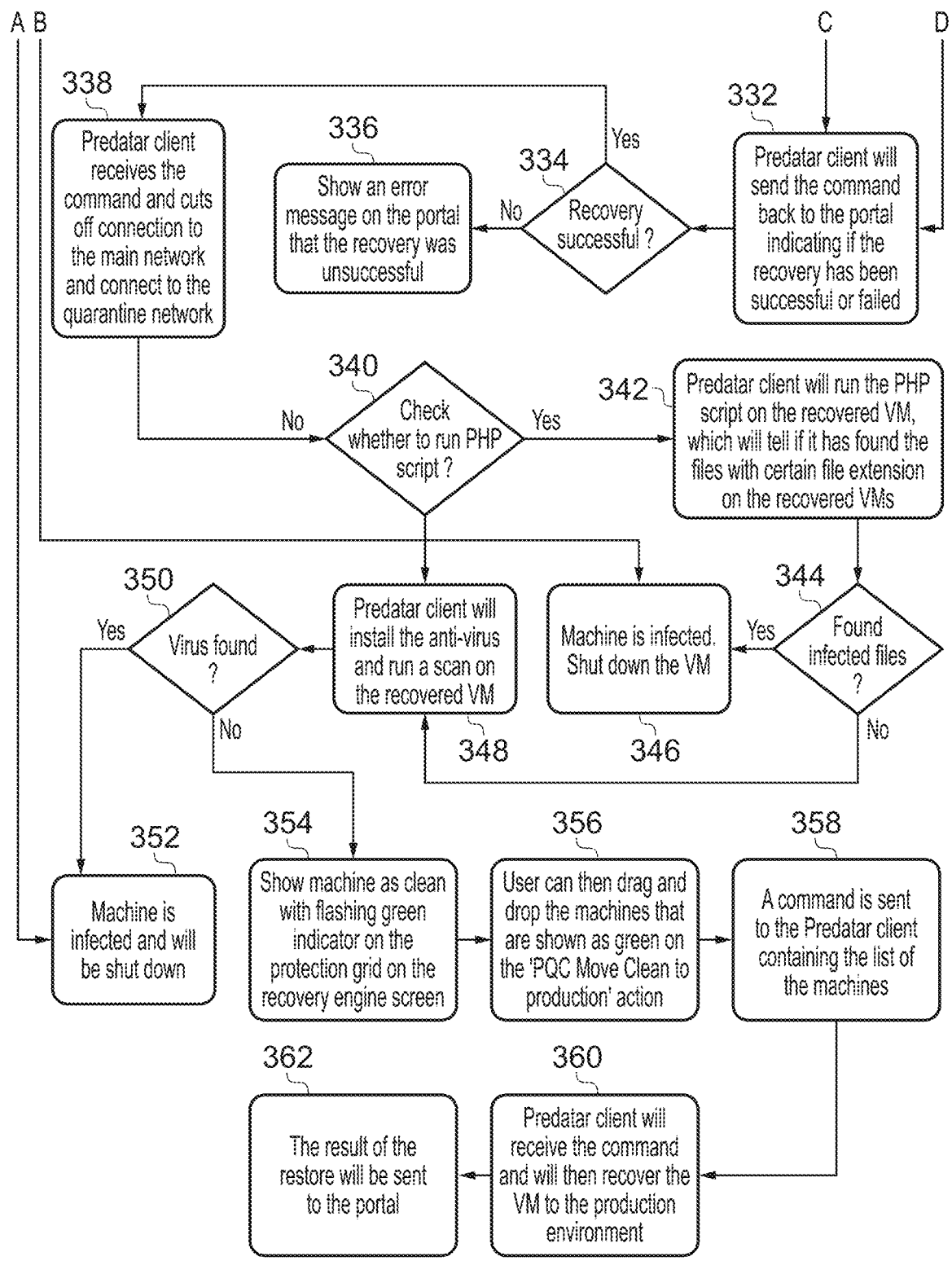

FIG. 3 shows an architecture and logical flow 300 of a computer-implemented method for operating a Ransomware Recovery system from the point of execution of a Global File Infection Search up to a Predatar Quarantine and Clean (PQC) production that constitutes a successful restoration of a computer system. The method may be performed on a system comprising a number of machines, each having a plurality of back-up files, such as that described previously with reference to FIG. 2.

At a first step 302, a single machine, multiple machines or a recovery group of machines of a computer system are selected, which may be achieved by dragged and dropping icons by a user onto an action labelled "Live Enter Infection Signature, Search for uninfected backups" in a graphical user interface. At a second step, a command is sent to the Client. The command contains a list of file extensions specified on the action of step one 302 that provide signatures relevant to infection events. The command also includes the list of machines that have been dragged and dropped onto the action.

A third step 306 constitutes a decision step that determines whether the machine or machines are backup up by IBM® Spectrum Protect (SP) or IBM® Spectrum Protect Plus (SPP). If the machine(s) are backup up by SP then the method moves to a forth step 308 in which a command is run on the SP backup and archive command line. This command will tell if it has found any files with an infection signature in the backup application. Alternatively, if the machine(s) are backed-up up by SPP then the method moves to a fifth step 310 in which an API (application programming interface) is called which will return a list of files with an infection signature that were backed up under a relevant Virtual Machine (VM).

In either instance, SP or SPP, the method proceeds to a sixth step 312, which is a decision step. The method determines whether any files have been identified that have an infection signature within a backup. If such files have been found then the method moves to a seventh step 314 in which the backup is marked as dirty (i.e. as infected with malware), which may be marked by providing a flashing red light on a grid of back-up entries. The method then proceeds to an eighth step 316, which is a decision step. The method checks to determine whether there exists any previous (i.e. earlier) backup. If such a backup does exist (which may, by virtue of having been created earlier, be infection free) then the method returns to the third step 306 to iterate through the step from the third step 306 onwards. However, if no such backup is found at the eighth step 316 then the method proceeds to a tenth step 320 in which the machine is marked as critical (possibly with a flashing red indication, for example) on the grid of back-ups indicating that there is no immediately recoverable backup and an message may be issued to alert a user. The method then proceeds to an eleventh step 322 as discussed further below.

If the method, at the sixth step 312, determines that no infected files have been found then the method proceeds to a ninth step 318 in which the backup is marked as clean with a flashing green indicator on the protection map grid shown on the recovery engine page. Such backups may be moved directly to PQC, as discussed below.

At the eleventh step 322, a user can drag and drop the machines shown as dirty onto the 'Recovery GFIS Clean to PQC' action. The method then proceeds to the twelfth step 324 in which a command is sent to the Client containing a list of machines dragged and dropped on to the 'Recover GFIS Clean to PCQ' action. The method then proceeds to a thirteenth step 326, which is a decision step. For a machine backed up by SP, the method proceeds to a fourteenth step 328, in which the SP VMs Client will send the command to SP for the VM to recover the relevant machines to a quarantine network that is isolated from the rest of the computer system. Alternatively, where a machine is backed up by SPP, the method proceeds to a fifteenth step 330 in which the VMs Client calls an SPP API to recover the machines to a quarantine network. In either case, SP or SPP, the method then proceeds to a sixteenth step 332.

At the sixteenth step 332, the Client sends a command back to the portal indicating if the recovery has been successful or has failed. The method then proceeds to a seventeenth step 334, which is a decision step. If the recovery has not been successful then the method proceeds to an eighteenth step 336 in which an error message on the portal is displayed to show that the recovery was unsuccessful. Alternatively, if the recovery has been successful, then the method proceeds to a nineteenth step 338 in which the Client receives the command and cuts off the connection to the main network and connects instead to the quarantine network.

The method then proceeds to a twentieth step 340, which is a decision step, in which the method determines whether to run a PHP (Predatar Hunt Pack) script. The PHP is a custom script that can be dropped onto the recovered machine in quarantine that will search specifically for infection signatures. In a simple case, just a change in file system extension, for example to ".RYK", may be used to identify malware, rather then performing a full virus scan, which would be more time consuming. The infection signature may be a filename, partial file name or a file extension. The PHP script may be a standalone script or may be embedded in the Client itself.

If it is determined to run the PHP script, then the method proceeds to a twenty first step 342 in which the Client runs the PHP script on the recovered VM to determine if there are files present with certain file extensions on the recovered VMs that are infection signatures. The method proceeds to a twenty second step, which is a decision step, in which the method determines whether any infected files have been found by the PHP script. If infected files have been found then the method proceeds to a twenty third step 346 in which the infected machine is shut down. The method then returns to the seventh step 314 to iterate through the subsequent steps. Alternatively, where the twenty second step does not find any infected files then the method proceeds to a twenty fourth step 348. If the twentieth step 340 determines that it is not appropriate to run the PHP script then the method also proceeds to the twenty fourth step 348.

At the twenty fourth step 348, the Client installs anti-virus software and runs a scan on the recovered VM. The method then proceeds to a twenty fifth step 350, which is a decision step. If the twenty fifth step 350 determines that a virus has been found then the method proceeds to a twenty sixth step 352 in which the infected machine is shut down. The method then returns to the seventh step 314 to iterate through the subsequent steps. Alternatively, if no virus is found at the twenty fifth step 350, then the method proceeds to a twenty seventh step 354 in which the machine is shown as clean (possibly with a flashing green indicator) on the protection grid of back-up entries in the GUI.

The method proceeds to a twenty eighth step 356 at which the user can drag and drop the machines that are shown as green on to the 'PQC Move Clean to production' action. Then, at a twenty ninth step 358 a command is sent to the Client containing the list of the machines that have been recovered. The method moves on to a thirtieth step 360 in which the Client receives the command and will the recover the VM to the production environment, i.e. the recovered machine will be returned to active duty within the computer system. Finally, at a thirty first step 362 the result of the restoration is sent to the portal.

FIGS. 4 to 14 illustrate aspects of a graphical user interface (GUI) that may be used to implement the methods described previously. The following disclosure provides a description of the elements of the GUI, and aspects of the GUI that implement features of the method described previously.

Figure 4:
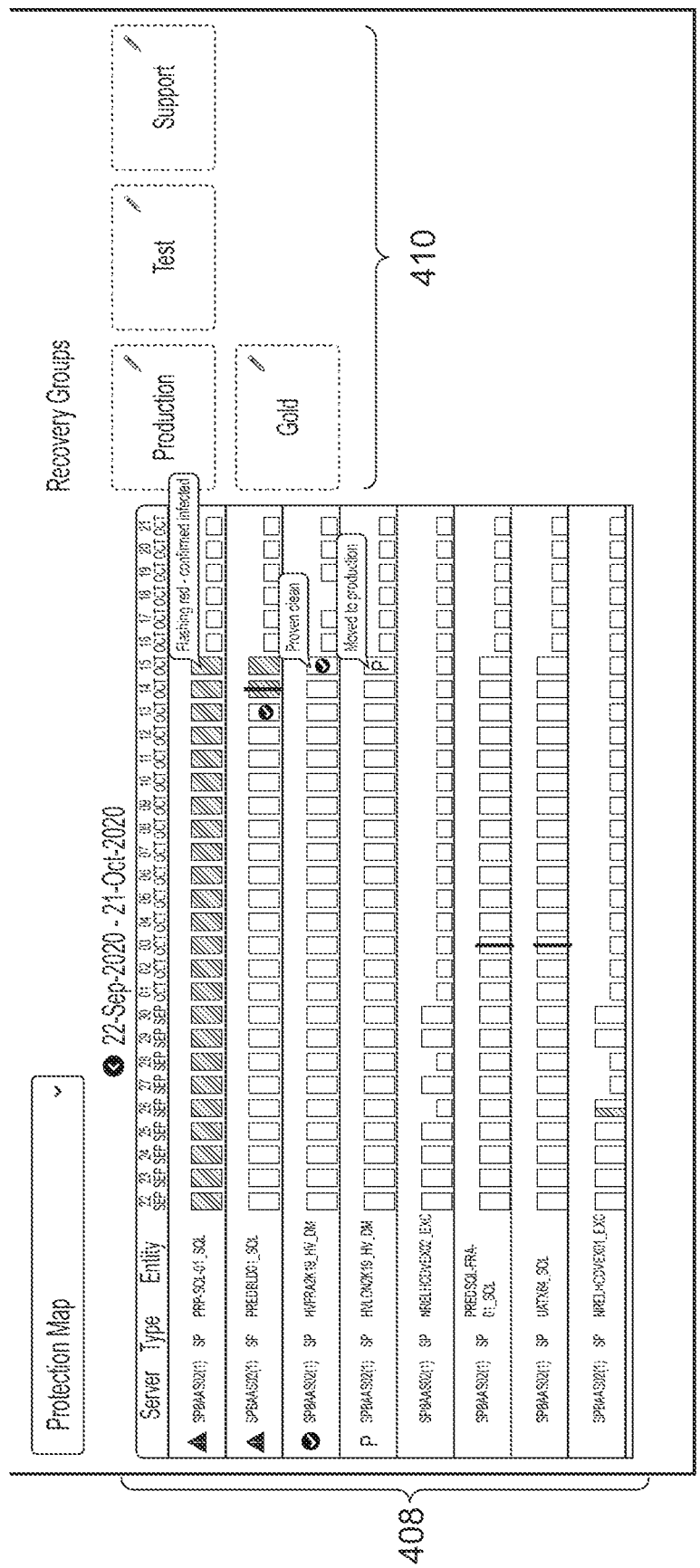
FIG. 4 illustrates a graphical user interface (GUI) layout comprising a number of portions.

FIG. 4 illustrates a GUI layout 400 comprising a number of portions, including a navigation portion 402, an activity portion 404, an actions portion 406, a protection map (or grid) portion 408 and a groups portion 410. It will be appreciated that the layout of the various portions on the display may be varied as required, and that not all portions 402-410 may be displayed in a single GUI layout. Various features of the respective portions are described further with reference to the figures below.

Figure 5:
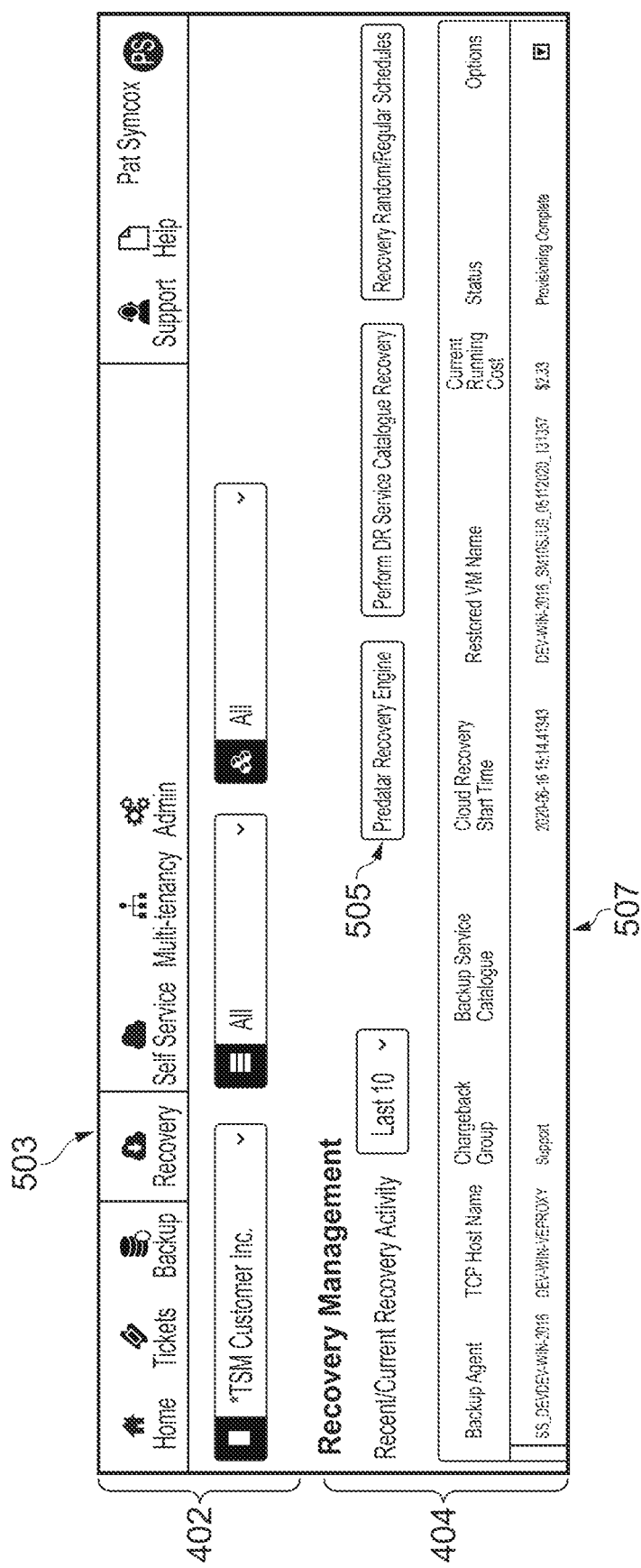
FIG. 5 illustrates a navigation portion and a activity portion of a GUI.

FIG. 5 illustrates the navigation portion 402 and the activity portion 404. The navigation portion 402 comprises a number of buttons, or tabs, that link to various features of the software package. In the present case, the recovery tab 503 is selected, resulting in the display of the GUI layout shown in FIG. 4. The activity portion 404 comprises a panic button 505 to initiate the recovery engine. The activity portion 404 also comprises a list 407 of recent events. The number of recent events displayed may be controlled and the events may be colour-coded. The events may comprise a list of the actions taken by the software, as discussed below.

When a user is informed of or suspects that a threat has occurred, they may initiate the recovery engine using the panic button 505. Activating the panic button 505 causes a dialogue box to be rendered for the user to enter a description of the threat, which may be provided to one or more users (which may be predefined in a War Room scenario as described previously). The panic button 505 initiates the recovery process and causes a dialogue box to be generated as described below with reference to FIG. 6a.

FIGS. 6a to 6d illustrate various style of boxes that may be used in combination with the GUI layout of FIG. 4 at various stages in the process.

FIG. 6a illustrates an example of the dialogue box or receiving user input to describe a threat situation. The elements of the dialogue box are described in the table below.

| # | ELEMENT | TITLE | DESCRIPTION |
|---|---|---|---|
| 1 | BUTTON | DONE | INPUT COMPLETE, AUTHENTICATE, AND INFORM WAR ROOM USERS OF THREAT EMAIL/TICKET |
| 2 | FIELD | REASON/ THREAT | FREE TEXT FIELD TO DESCRIBE THE THREAT |
| 3 | RID TIME | FIELD | DATE FIELD FOR SUSPECTED INFECTION OR SYMPTOMS. |
| 4 | PW AUTHENTICATION | PASSWORD | PASSWORD FOR WAR ROOM USER REQUIRED TO INVOKE RECOVERY RESPONSE. |

On entering the information into the dialogue box, a ticket may be raised, or an email distributed, to send a message to the predefined War Room users. The message may contain the information provided by the user and additional pre-agreed information, such as muster details, for example, attend zoom meeting/come into office, etc.

An example of elements of the message to the War Room users is provided in the table below.

| # | ELEMENT | TITLE | DESCRIPTION |
|---|---------|-------|-------------|
| 1 | FIELD | REASON/ THREAT | FREE TEXT FIELD TO DESCRIBE THE THREAT |
| 2 | FIELD | MUSTER DETAILS | FREE TEXT WITH ZOOM DETAILS ETC . . . |
| 3 | RID TIME | FIELD | DATE FIELD FOR SUSPECTED INFECTION OR SYMPTOMS. |

The global RID times may be auto-populated for all recovery groups of machines or virtual machines. The RID recovery time may also be changed at a number of levels, for example at machine level, at group level or globally. Such functionality may be useful because the RID time may vary by geography, operating system or machine domain.

FIG. 6b illustrates a dialogue box for setting RID time information, and contains the elements described in the table below.

| # | ELEMENT | TITLE | DESCRIPTION |
|---|---------|-------|-------------|
| 3 | RID TIME | FIELD | DATE FIELD FOR SUSPECTED INFECTION OR SYMPTOMS. |

Figure 9:
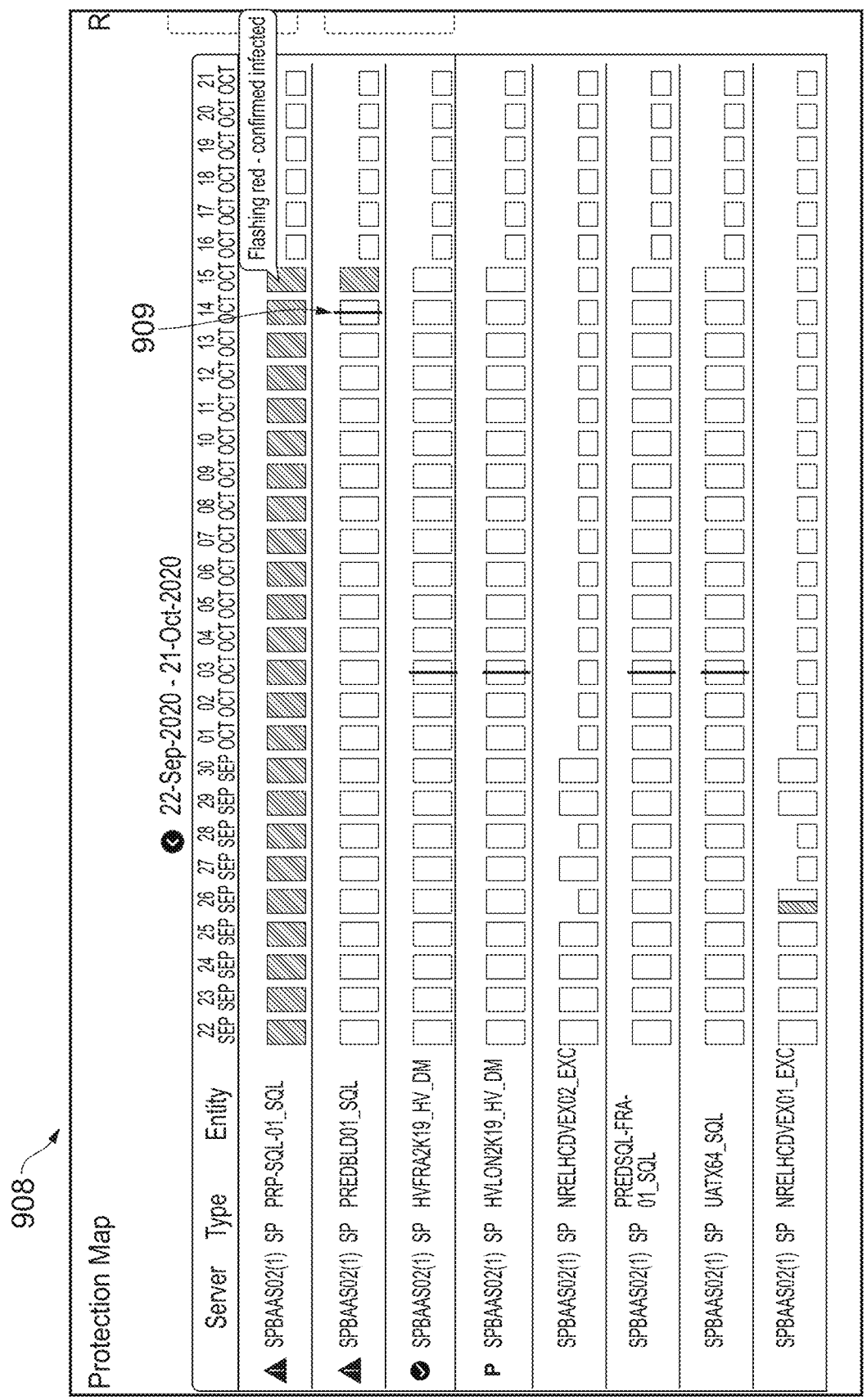
FIG. 9 illustrates an example of a protection map.
Figure 10:
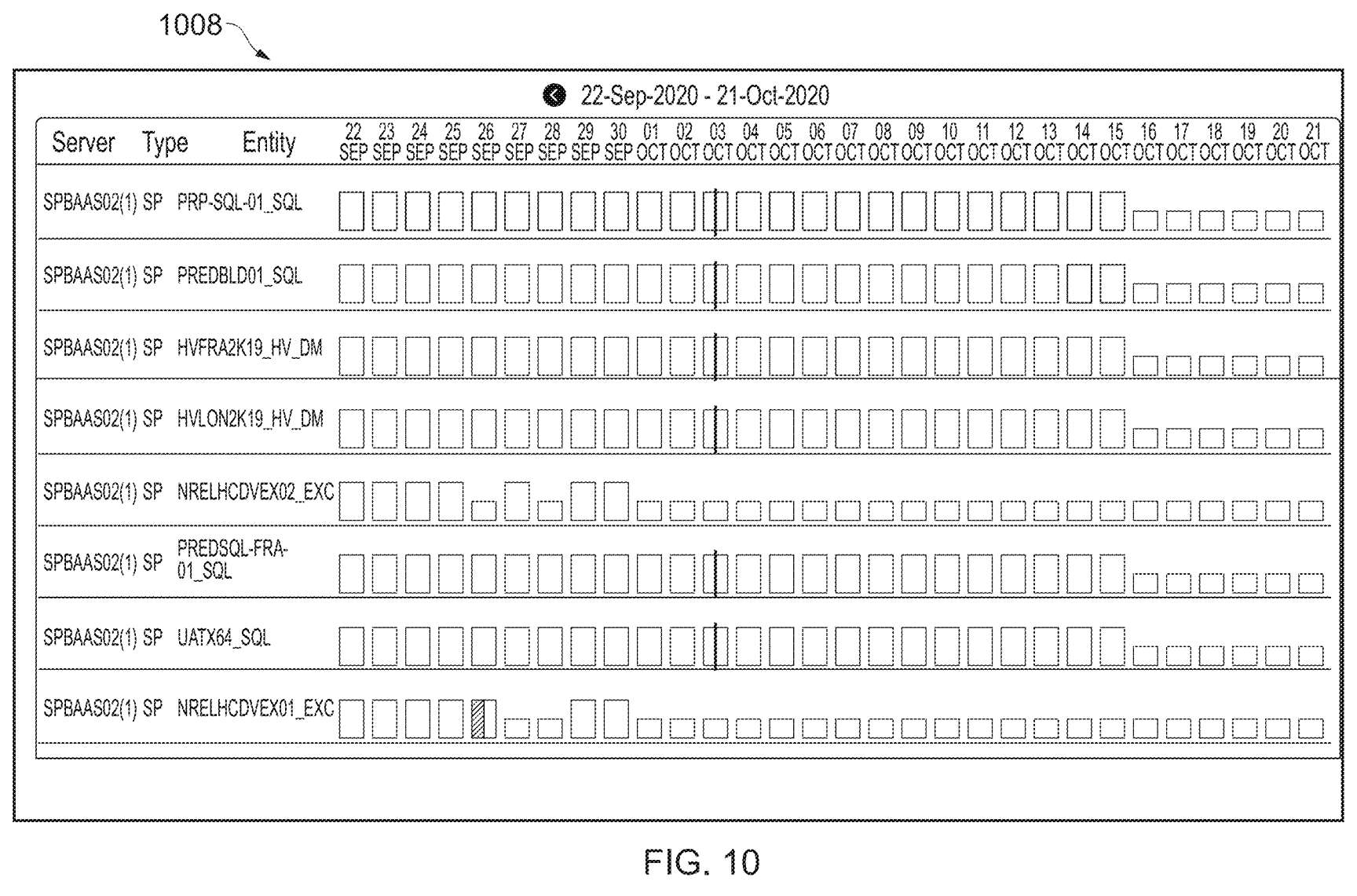

Turning to FIGS. 9 and 10, which show examples of the protection map 908, 1008, or grid, introduced previously with reference to FIG. 4, the protection map graphically illustrates the status of the respective backups for each machine of interest as a function of time/date. Colour coding may be used to denote a backup that is known to be infected (for example red or flashing red for a confirmed infected backup, bright green for a confirmed clean backup, pale green for an assumed clean backup).

In FIG. 9, the whole first row in the protection map is marked to signify that the node is critical because no uninfected backup is available. In such case, the War Room users may be alerted by Email/Ticket.

The RID time for each machine may also be displayed. In this example, each machine is provided on a different row, each column represents a different back up time slot, and a vertical line 909 represents an RID time associated with a particular machine. A header in the protection map 908 includes headings for the server, machine type, entity and the date/time of each backup slot.

An example of a description of the interface elements for the status portion is provided in the table below.

| # | ELEMENT | TITLE | DESCRIPTION |
|---|---------|-------|-------------|
| 1 | RID TIME | TOGGLE | SWITCH TO REMOVE OR ADD RID TIME ICON FOR SUSPECTED INFECTION OR SYMPTOMS. |
| 2 | RID TIME MARKER | ICON | BLUE LINE THROUGH CELLS DISPLAYING LATEST RID UPDATE FOR THE CELL. |

IN THE PROTECTION MAP MAY PROVIDE AN OPTION FOR VIEWING RID TIME MARKERS, WHICH WHEN TURNED ON WILL SHOW THE RID MARKER LINES FOR EACH MACHINE.
IF NO RID TIME HAS BEEN SPECIFIED FOR A MACHINE, THEN THE RID TIME SPECIFIED AT A RECOVERY GROUP LEVEL THAT MACHINE IS INCLUDED IN MAY BE USED.

FIGS. 7a to 7e illustrate various aspects of the actions portion 406. The actions portion may provide a menu of configurable or preconfigured actions. In one mode of use, a user may drag and drop groups of machines from the group portion 410 onto specific actions in the actions portion 406. In this way, the user may control the technical task of performing data recovery for a group of machines in an improved manner compared to existing interfaces, which may involve entering many lines of command line instructions in order to achieve the same effect. In order to that implement such functionality, it may be convenient for the groups portion to be located adjacent to the actions portion 406. In addition to the functionality of group selection provided using the abstraction of the predefined groups in the groups portion 410, the machines associated with the individual rows in the protection map 408 may be selectable by clicking and dragging that row, for example, onto an action in the actions portion 406 in order to perform a selected task for a particular machine. For this reason, it may also be preferable for the protection map 408 to be provided adjacent to the actions portion 406.

The actions portion may contain the actions to: enter infection signature, search for uninfected backups, recover GFIS clean to PCQ, Install and Run PHP in PQC, Install and run AV, PQC Move Clean to production, Flag as condemned hardware for OS reinstall and notify when ready for BA Client/TDP Restore (reinstallation of the Operating System and then flag when that is done so that the Backup Client Software can be reinstalled manually), Declare OS platforms/versions clear here and prompt for removal from recovery groups, Search for latest Pre RID Time backups and recover to safety, and Immediately backup all clearly scanned boxes.

With reference to these actions in the recovery process, a user can proceed through the recovery exercise by dragging and dropping individual or multiple recovery point cells from the protection map onto the actions, or by dragging whole groups onto the actions, as described previously. The cell status in the protection map will change as the process proceeds.

Figure 7B:
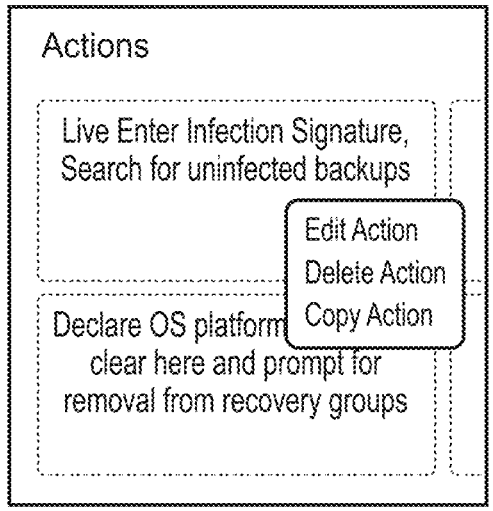
Figure 7C:
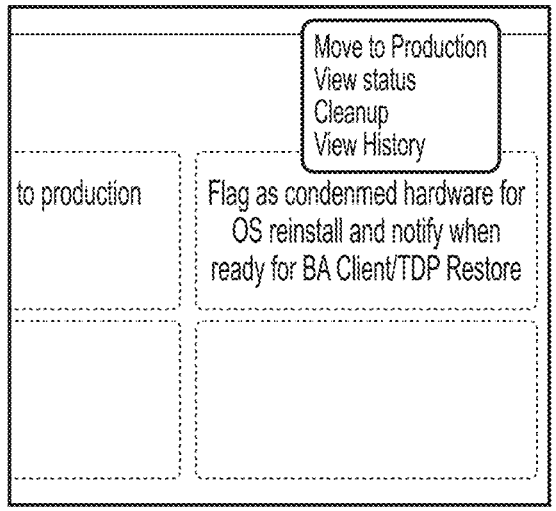

FIG. 7b illustrates a blown up portion of the action portion 406 illustrated in FIG. 7a. In this example, if a user performs a secondary selection of a particular action (for example right click) the user can choose from a sub menu to edit, delete or copy the action.

If the user is to perform a primary selection (for example, left click mouse) on one of the actions, a dialogue box may be generated. For example, if a user were to primary select the live enter infection signature action illustrated in FIG. 7b, the dialogue box illustrated in FIG. 6c may be generated to receive user input.

Turning to the production map illustrated in FIG. 10, it can be seen that all of the nodes are flagged such that they are ready to be moved to production. A user may perform this action by dragging the required nodes to the "flag as confirmed hardware for OS reinstall and notify when ready for BA client/TP restore" action, which generates the sub menu shown in FIG. 7c, including the options: move to production, view status, clean up and view history. Alternatively, as shown in FIG. 9, one of the nodes has failed its antivirus process for the most recent backup, resulting in the RID time 909 for that node being pushed back to the next most recent backup.

Figure 7D:
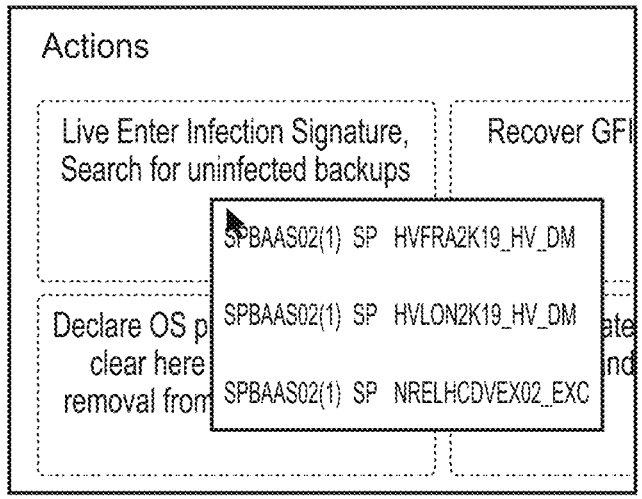

FIG. 7d illustrates a graphical representation that is provided at the cursor when multiple nodes have been selected and dragged from the protection map to the actions portion.

Figure 7E:
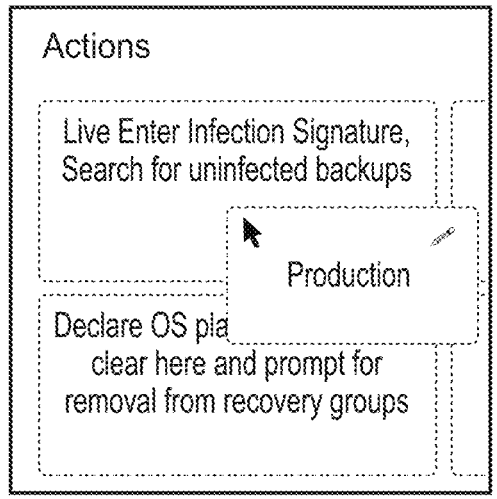

FIG. 7e illustrates a graphical representation that is provided at the cursor when an entire group is selected from the groups portion and dragged to an action in the actions portion.

In both FIGS. 7d and 7e, the graphical representation of the node or group of nodes is translucent over the remainder of the GUI layout.

FIG. 6d illustrates an example of a dialogue box that may be generated when a plurality of nodes are selected and dragged to a particular action. The dialogue box seeks confirmation that the action is required for each of the selected nodes. A description of the action is provided in the table below.

| # ELEMENT | TITLE | DESCRIPTION |
| --- | --- | --- |
| 1 ACTION BUTTON | BUTTON CUSTOMISATION | PORT AND ENHANCE ACTION EDIT FUNCTION FROM CLIENT EVENTS TO ALLOW RECOVERY POINT OR POINTS TO BE DRAGGED AND DROPPED FROM THE RECOVERY GROUP SIMILAR TO CLIENT EVENTS FUNCTION. |

Figure 8:
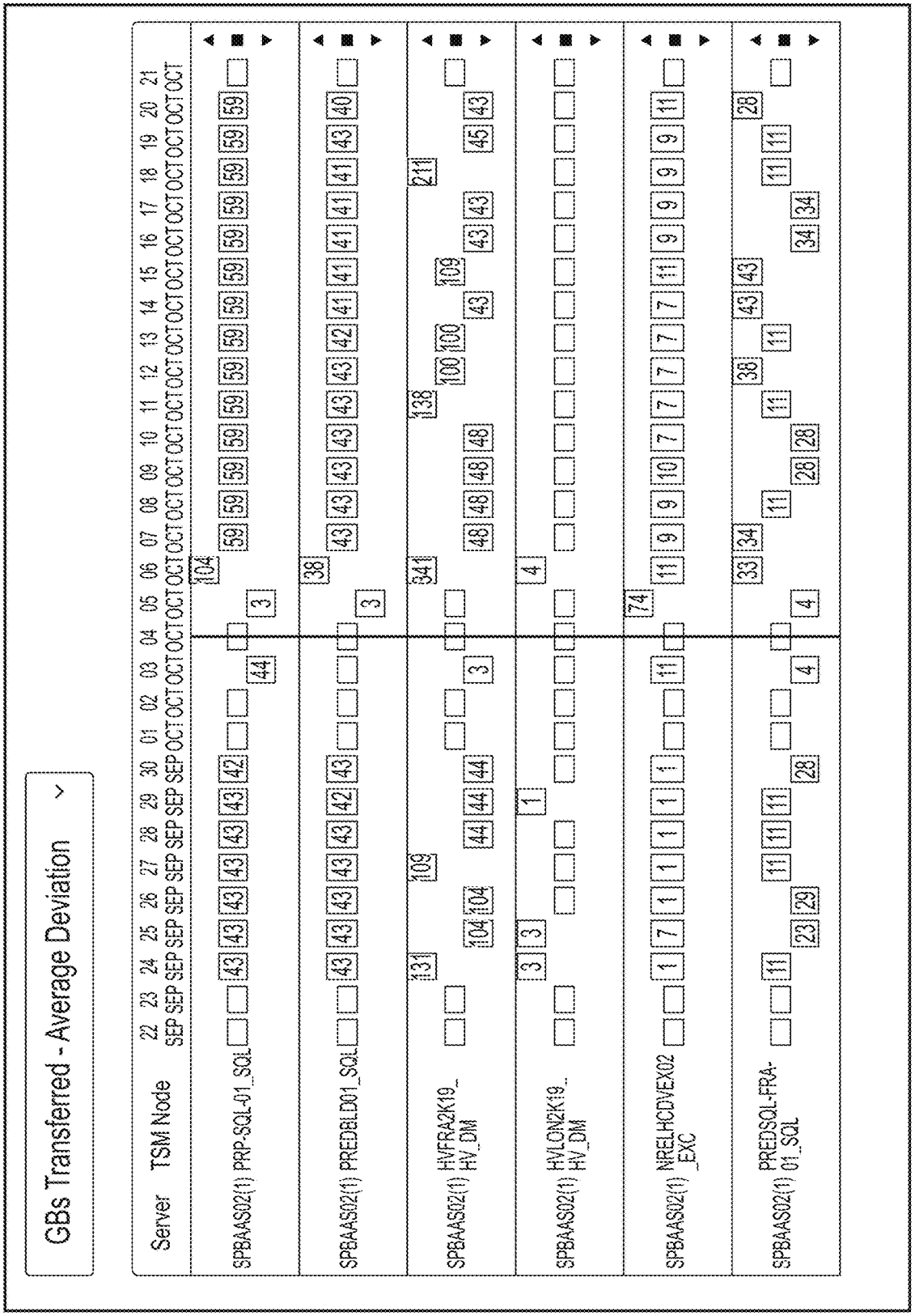
FIG. 8 illustrate a GUI profile providing a data rate transfer report.

FIG. 8 illustrates a GUI profile providing a data rate transfer report, which may be provided in addition to those included in FIG. 4. A ransomware attack may result in a large increase in back-up size due to the encryption of data on the node. Similarly, an attack may result in an increase in data traffic from a node in cases in which data is removed from the node by malware. Unusual changes in data rate or back-up size may therefore be used to determine the RID time of an infection event.

In FIG. 8, a GUI provides a deviation report which may be togglable with the protection map in FIG. 4. The deviation report shows a data transfer size corresponding to each of the back-ups for each machine. The grid structure corresponds to that described previously with reference to the protection map. The same machine order may be maintained between both views. In this way, the user may find a suspect deviation then toggle to the same node in the protection map to understand if there is a correlation with the RID Time.

Figure 11:
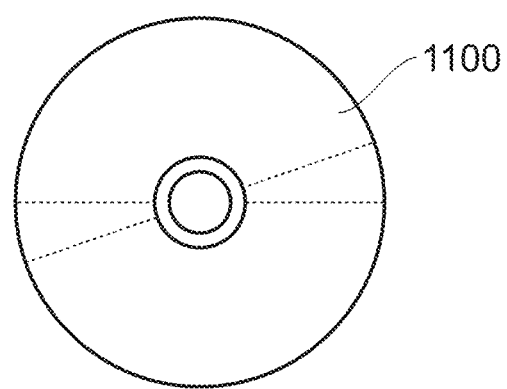
FIG. 11 illustrates an example computer program product.

FIG. 11 shows an example computer program product 1100 (equivalently, a computer readable memory medium) that contains instructions that, when executed, cause an system, as described in relation to FIG. 2, to at least perform steps of any of the methods described herein.

The invention claimed is:

1. A computer-implemented method for restoring a computer system following an infection event, the computer system having a plurality of machines, in which a plurality of back-up copies are associated with each of the plurality of machines, and in which each of the plurality of back-up copies associated with a particular machine is a different version back-up, the method comprising:
    searching the plurality of back-up copies to identify one or more back-up copies that comprise a signature of the infection event;
    selecting, subsequent to the searching the plurality of back-up copies, a back-up copy for a particular machine from the one or more back-up copies that comprise a signature of the infection event;
    moving the selected back-up copy to a quarantine environment;
    automatically cleaning the selected back-up copy in the quarantine environment to provide a clean-back-up copy; and
    restoring one or more of the plurality of machines to a live environment using the clean-back-up copy.

2. The method of claim 1, comprising searching each of the plurality of back-up copies to identify one or more clean-back-up copies that do not comprise a signature of the infection event.

3. The method of claim 1, comprising determining an infection-datum-time for the computer system by identifying a creation time of a clean-back-up copy created before an earliest back-up copy that comprises a signature of the infection event.

4. The method of claim 1, wherein the quarantine environment is a computing environment that is isolated from potential sources of infection.

5. The method of claim 1, wherein restoring one or more of the plurality of machines comprises installing anti-virus software dated subsequent to the infection-datum-time on at least one of the plurality of machines.

6. The method of claim 1, wherein the signature of the infection event is a user defined signature.

7. The method of claim 1, comprising:
    providing a graphical user interface comprising:
        elements associated with actions in the method for restoring the system; and
        elements associated with the plurality of machines; and
    receiving a user selection associating one or more of the elements associated with the plurality of machines with one of the elements associated with the actions in order to associate a corresponding one or more of the plurality of machines with a corresponding one of the actions.

8. The method of claim 7, in which the selection is achieved by the user dragging the one or more elements associated with the plurality of machines to the one of the elements associated with the actions.

9. The method of claim 7, in which the elements associated with the plurality of machines include an indication of a status for each of the plurality of back-up copies associated with the respective machines.

10. The method of claim 1, wherein the selecting and moving actions comprise a drag and drop action initiated by a user.

11. The method of claim 1, comprising:
    providing a graphical user interface comprising:
        elements associated with actions in the method for restoring the system; and
        elements associated with respective groups of machines of the plurality of machines; and
    receiving a user selection associating one or more of the elements that are each associated with a respective group the plurality of machines with one of the elements associated with the actions in order to associate a corresponding one or more groups of the plurality of machines with a corresponding one of the actions.

12. A computer-implemented method for restoring a computer system following an infection event, the computer system having a plurality of machines, in which a plurality of back-up copies are associated with each of the plurality of machines, and in which each of the plurality of back-up copies associated with a particular machine is a different version back-up, the method comprising:
    searching the plurality of back-up copies to identify one or more clean-back-up copies that do not comprise a signature of the infection event; and
    restoring one or more of the plurality of machines using a respective clean-back-up copy, wherein the plurality of machines are partitioned into at least:
        a first-recovery-group of machines comprising a first plurality of the machines; and a second-recovery-group of machines comprising a second plurality of machines, further comprising restoring the first-recovery-group of machines using a respective first-clean-back-up copy for each respective one of the first plurality of machines, each first-clean-back-up copy created before a first-infection-datum-time, further comprising restoring the second-recovery-group of machines using a respective second-clean-back-up copy for each respective one of the second plurality of machines, each second-clean-back-up copy created before a second-infection-datum-time, wherein the second-infection-datum-time is earlier than the first-infection-datum-time.

13. The method of claim 12, wherein the first-recovery-group of machines comprises one or more immune machines that are excluded from the first plurality of machines.

14. The method of claim 12, wherein:
the first plurality of machines are geographically situated within a first-geographical-area;
the second plurality of machines are geographically situated within a second-geographical-area; and
the first-geographical-area is non-overlapping with respect to the second-geographical-area.

15. The method of claim 12, wherein the first plurality of machines use a first operating system, the second plurality of machines use a second operating system and the first operating system is different from the second operating system.

16. The method of claim 12, comprising:
providing a graphical user interface comprising:
 elements associated with actions in the method for restoring the system;
 an element associated with the first-recovery-group; and
 an element associated with the second-recovery-group; and
receiving a user selection associating the first- or second-recovery-group with one of the actions.

17. An apparatus comprising:
at least one processor; and
at least one memory including computer program code for one or more programs,
the at least one memory and the computer program code configured to, with the at least one processor, cause the apparatus to perform the method claim 1.

18. A computer program product including one or more sequences of one or more instructions which, when executed by one or more processors, cause the computer program product to at least perform the method claim 1.

19. An apparatus comprising:
at least one processor; and
at least one memory including computer program code for one or more programs,
the at least one memory and the computer program code configured to, with the at least one processor, cause the apparatus to perform the method claim 12.

20. A nontransitory computer program product medium including one or more sequences of one or more instructions which, when executed by one or more processors, cause the computer program product medium instructions to at least perform the method claim 12.

\* \* \* \* \*